United States Patent
Kraus

[11] Patent Number: 5,906,342
[45] Date of Patent: May 25, 1999

[54] HOLDING DEVICE MADE OF PLASTIC

[75] Inventor: Willibald Kraus, Grunstadt, Germany

[73] Assignee: TRW United-Carr GmbH & Co. KG, Germany

[21] Appl. No.: 08/098,516

[22] Filed: Jul. 28, 1993

[30]     Foreign Application Priority Data

Aug. 4, 1992 [DE] Germany ............................. 42 25 742

[51] Int. Cl.⁶ .................................................. F16L 3/08
[52] U.S. Cl. ...................... 248/74.1; 24/16 PB; 24/487; 248/71; 248/73
[58] Field of Search ................................ 248/74.3, 74.2, 248/71, 73, 74.1, 231.5, 316.5; 24/16 PB, 17 AP, 487, 458

[56]         References Cited

U.S. PATENT DOCUMENTS

| | | | |
|---|---|---|---|
| 2,396,837 | 3/1946 | Ellinwood | 248/74.3 X |
| 2,937,834 | 5/1960 | Orenick et al. | 248/74.3 X |
| 2,969,216 | 1/1961 | Hallsey | 24/16 PB X |
| 3,126,183 | 3/1964 | Hopkins | 248/73 |
| 3,144,695 | 8/1964 | Budwig | 24/16 PB |
| 3,163,712 | 12/1964 | Cochran | 248/71 X |
| 3,341,903 | 9/1967 | Buntic | 24/16 PB |
| 3,429,985 | 2/1969 | Czigler | |
| 3,737,128 | 6/1973 | Schuplin | |
| 3,758,060 | 9/1973 | Schuplin | 24/16 PB X |
| 4,264,047 | 4/1981 | Nelson | 248/73 |
| 4,334,659 | 6/1982 | Yuda | |
| 4,372,011 | 2/1983 | Aranyos | |
| 4,386,752 | 6/1983 | Pavlak et al. | |
| 4,478,381 | 10/1984 | Pittion et al. | 248/71 |
| 4,635,886 | 1/1987 | Santucci et al. | 248/74.1 |
| 4,648,735 | 3/1987 | Oddenino | 248/74.3 X |
| 4,762,296 | 8/1988 | Kraus et al. | |
| 4,802,646 | 2/1989 | Cattani | |
| 4,840,345 | 6/1989 | Neil et al. | |
| 4,919,373 | 4/1990 | Caveney et al. | 248/74.3 |
| 5,020,749 | 6/1991 | Kraus | |
| 5,131,613 | 7/1992 | Kamiya et al. | 248/74.3 |
| 5,169,100 | 12/1992 | Milcent et al. | 248/74.3 X |
| 5,277,387 | 1/1994 | Lewis et al. | 24/487 X |

FOREIGN PATENT DOCUMENTS

| | | | |
|---|---|---|---|
| 1318688 | 1/1963 | France | 24/16 PB |
| 2483541 | 5/1980 | France . | |
| 2515776 | 11/1982 | France . | |
| 2807119 | 8/1979 | Germany . | |
| 1305717 | 2/1973 | United Kingdom . | |

*Primary Examiner*—Derek J. Berger
*Attorney, Agent, or Firm*—Fay, Sharpe, Beall, Fagan, Minnich & McKee, LLP

[57]             ABSTRACT

A holding device (1) made of plastic for attachment to a support for holding and supporting at least one tube-shaped body comprises an attachment portion (2) connectable to the support and a holding portion (3) of two half-dishes (4, 5) enveloping the tube-shaped body. The two half-dishes are connected with each other at the side next to the attachment portion (2). At the side opposite the attachment portion (2), the half-dishes are connected by at least one hinged element (6) while at the side next to the attachment portion (2) they are joined by a snap-in catch device (7) arranged within the attachment portion (2).

30 Claims, 5 Drawing Sheets

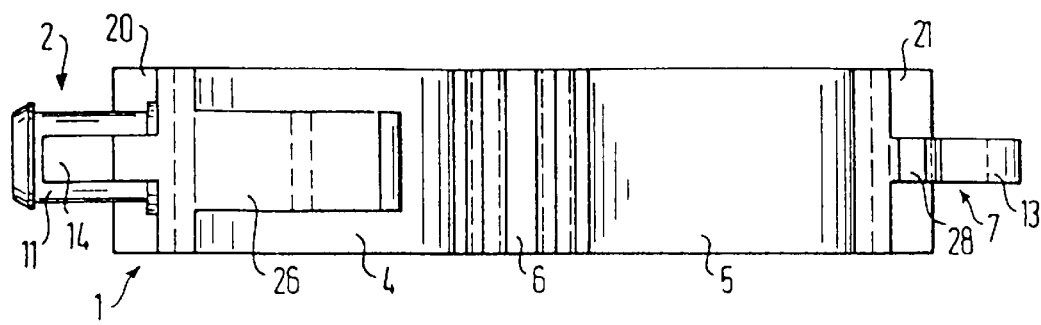
FIG. 1
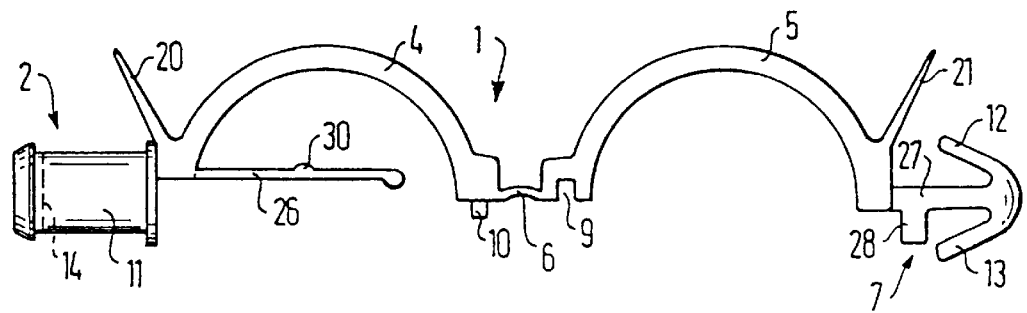
FIG. 2
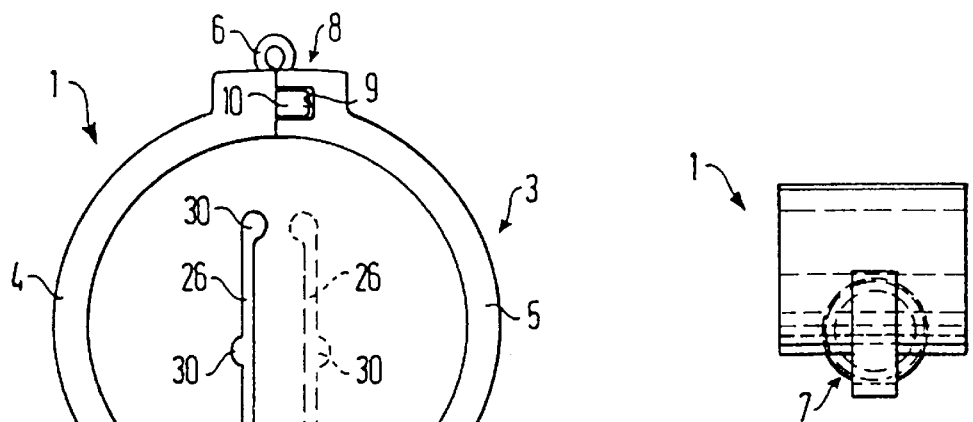
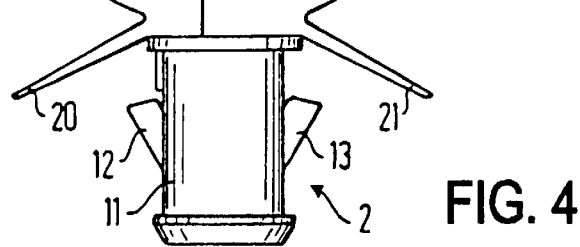
FIG. 3
FIG. 4

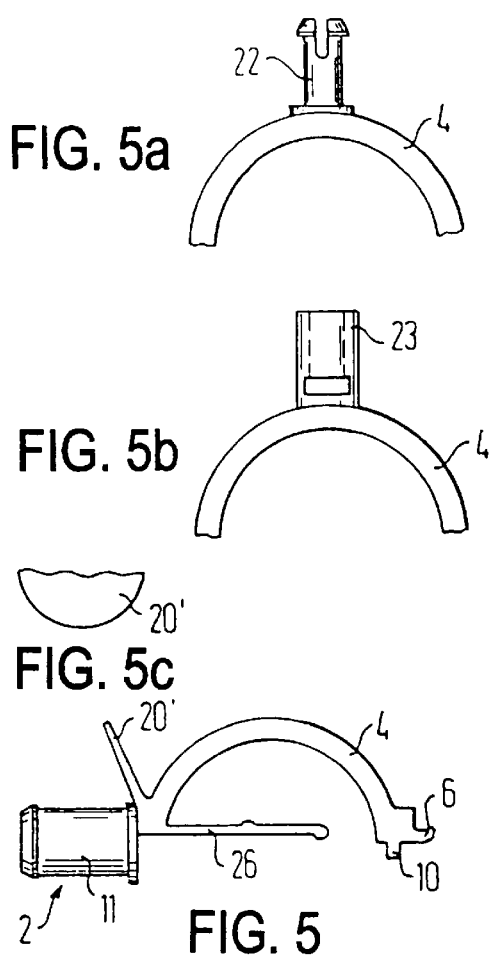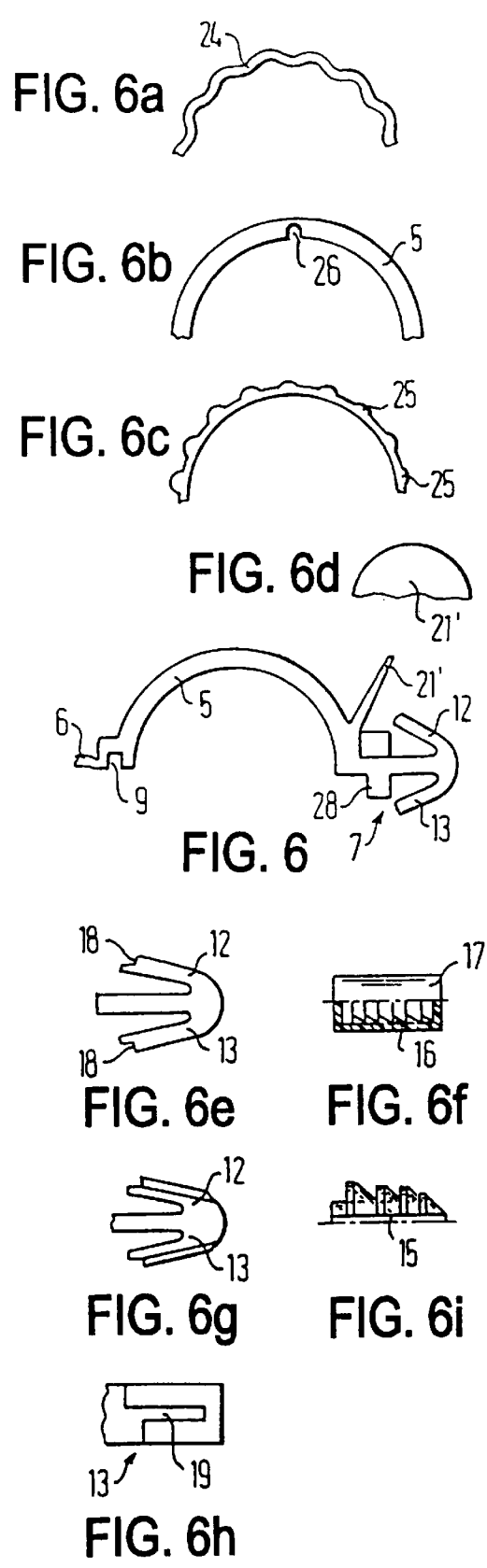

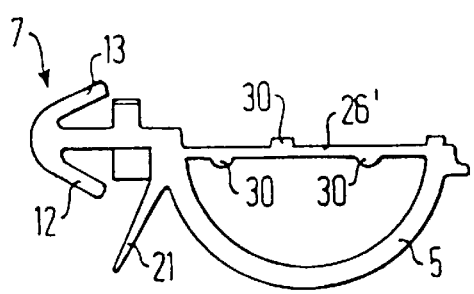
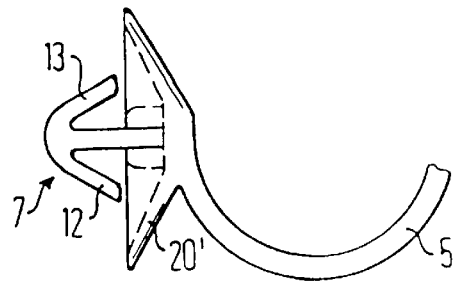
FIG. 9    FIG. 10
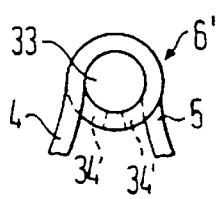
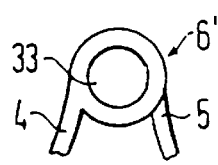
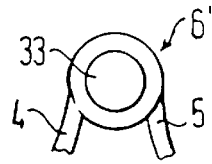
FIG. 11a    FIG. 12a    FIG. 13a
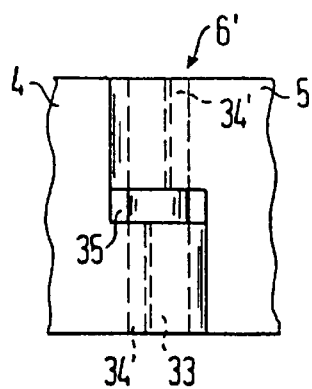
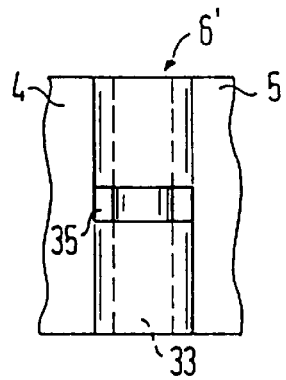
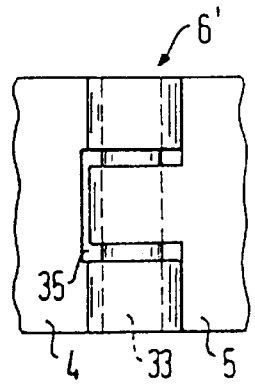
FIG. 11b    FIG. 12b    FIG. 13b

HOLDING DEVICE MADE OF PLASTIC

BACKGROUND OF THE INVENTION

The invention is directed to a holding device made of plastic for attachment of at least one tube-shaped body to a support. The device includes an attachment portion that is connectable to the support and carries the holding portion comprised of two half-dishes arranged for enveloping and holding the tube-shaped body. The half-dishes are connected with each other on the side next to the attachment portion.

A holding device is already known in the art where the holding portion exhibits two flanges that are connected with each other via a screw connection after receiving a tube-shaped body. (See, for example, published British Patent Application 2 187 255.) In this known device, the two flanges enclose a profiled end zone of a cone, which in turn is connectable with a support via an attachment zone. This results in high manufacturing expense because of the multiple piece construction. Also, the assembly expense is high because of the effort necessary to attach the entire unit in a functionally correct manner to a support.

In addition to the above, a holding device of plastic is known where there is arranged below a support plate a half-round shaped attachment zone. Above the support plate there is provided a strip-like element which engages with a mating cam in a closed position and functions as a holding zone after putting into place at least one tube-shaped body. (See British Patent 1,022,820.)

Further known in the prior art is a regulation plastic base nut which has two half-dishes connected with one another by a film-type hinge joint. The half-dishes respectively exhibit a conical inner diameter and frontally pass over into the attachment zone. After closing of the two half dishes, the entire unit can be positioned in a rectangularly designed support aperture. (See German Petty Patent 75,03424.1). This known device is merely designed as a regulation base nut and is unable, on the one side, to be attached to a support and, on the other side, is incapable of being attached to a traversing tube-shaped part, for example a hose or a tube.

In contrast thereto, the present invention has as the primary object to create a holding device of the initially mentioned type which is of low construction expense and simple design, but which can be functionally and correctly installed rapidly.

SUMMARY OF THE INVENTION

This task is solved according to the invention in that the two half-dishes are hinge connected with each other on the side opposite the attachment portion. A snap-in type catch device joins the two half-dishes in the closed position. The catch device is arranged in the attachment portion. Because of the special design of the holding device, there results a significant reduction in the construction and installation expense. Note that the two half-dishes need merely be transferred from the open position to the closed position, whereupon they are clipped together via the catch arrangement and can immediately be connected with a support via the attachment portion.

According to an alternative embodiment of the invention, the two half-dishes and the hinge can be designed as a single piece. In such an arrangement, the attachment zone can be designed as a slotted casing into whose interior zone the catch device with a snap-in element can be positioned. Beneficially, the catch device exhibits two oppositely facing resilient and conically tapering cross-pieces. In the closed position, the cross-pieces project at least partially through the outer circumference of the slotted casing and form part of the attachment zone. The resilient cross-pieces may respectively be equipped in their end zones with contact edges. Alternatively, there exists the possibility that the resilient cross-pieces can be divided by at least one slot with each piece on the opposite sides of the slot being of different length. As a result of such an arrangement, it is possible to take into consideration the different thicknesses of the support when placing the attachment portion in the support.

In a further embodiment of the invention, the attachment portion and the catch device can respectively be designed as parts of a "pine-tree" bolt which are lockable with one another. Alternatively, there also exists the possibility that the two parts can be equipped with inner profiling to constitute components of an attachment casing for engagement on a profiled stud or bolt.

In order to attach the holding device resiliently in the support and to protect it from impurities, a resilient lip may be arranged between the respective half-dish and the attachment portion. The resilient lip can be randomly designed and can, for example, have a rectangular, a half-round or oval external circumference. In addition, the resilient lip has the function of adapting to various support thicknesses. The resilient lip in an alternative design can also be positioned to extend fully circumferentially of one half-dish.

According to a further aspect of the invention, the holding device can connect in the form of a modular design with other parts. For this purpose, at least one half-dish may be equipped at its exterior circumference with an insertion cone or an insertion casing. This makes it possible, in modular fashion, to attach to the holding dish of a next adjacent element so that, for example, several tube-shaped parts can be positioned parallel.

The half-dishes can be of rigid design or they can be flexible and can include at least another film hinge. Also, they can be designed elastically or can have cross pieces extending longitudinally at the interior circumference. Thus, the half-dishes must not necessarily be rigidly designed, but can act resiliently in order to elastically encompass the respective tube-shaped part.

According to another aspect of the invention, at least one half-dish can have a resilient finger at the interior circumference. The resilient finger can contact with the tube-shaped part to be stored to effect an additional holding force even if the tube-shaped part has a smaller diameter than the diameter of the two closed half-dishes of the holding device. The resilient finger can be placed unilaterally in the attachment zone and can have a lesser width than the half-dish. Additionally, the resilient finger can exhibit on at least one side a bulge or rib so that excellent and improved holding effect is assured when the tube which is contacted by the resilient finger.

Alternatively, there exists the possibility that the half-dishes can have several resilient fingers. The resilient fingers can be arranged in parallel fashion, at an angle to each other or in the form of rays. There also exists the possibility that the resilient finger or fingers can be attached at opposite ends to the inner circumference of the respective half-dish.

In a further refinement of the invention, the slotted housing and the catch element can respectively be equipped with at least one groove and a projection cooperating therewith. Through engagement of the corresponding projection with the groove, pre-mounting is assured in simple fashion.

BRIEF DESCRIPTION OF THE DRAWINGS

The above and other objects and advantages will become apparent from the following description when read in conjunction with the accompanying drawings wherein:

FIG. 1 is a top plan view of the preferred embodiment of the holding device in its open position;

FIG. 2 is a side view of the holding device of FIG. 1 in open position;

FIG. 3 is a right end view of FIG. 2;

FIG. 4 is a front elevational view of the holding device according to the invention in a closed operative position;

FIGS. 5a–5c show various design possibilities of the individual components of a part of the holding device;

FIGS. 6a–6i show various design possibilities of another part of the holding device;

FIG. 9 is another form of the invention in partial side elevation;

FIG. 10 is a showing of another design of the circumferential lip with the half-dish portion shown only partially;

FIGS. 11a and 11b are partial side elevational and top plan views, respectively, of modified forms of the hinge joints for the two half-dishes;

FIGS. 12a and 12b are views corresponding to FIGS. 11a and 11b but showing a further modification of the hinge joint for the two half-dishes;

FIGS. 13a and 13b are views corresponding to FIGS. 11a and 11b but showing a still further modification of the hinge joint for the two half-dishes;

DETAILED DESCRIPTION OF THE PREFERRED AND ALTERNATE EMBODIMENTS

Figure 7:
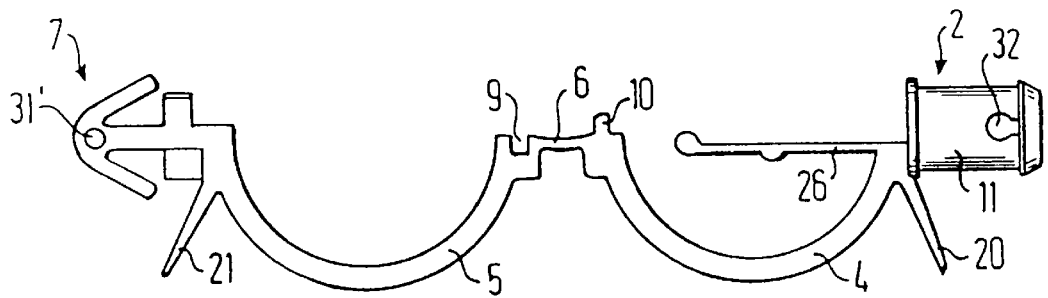
FIGS. 7a–7i show a further modifications of the holding device according to the invention with different design variations.

Referring more particularly to the drawings wherein the showings are for the purpose of illustrating preferred embodiments of the invention only, and not for the purpose of limiting same, FIGS. 1 to 4 show the holding device 1 as being made of plastic and comprised of an attachment zone or portion 2 adapted for connection with a support (which is not shown). A holding zone or portion 3 designed for surrounding and holding a tube-shaped body is carried by the attachment zone 2. The holding zone 3 is comprised of two half-dishes 4 and 5 which, according to FIG. 4, are connected with one another by a hinge 6 on the side opposite to the attachment zone 2.

As is apparent from FIGS. 1 to 3, the holding device 1 is preferably designed to be molded as a one piece unitary structure. In the upper area, the two half-dishes 4 and 5 are connected with each other by at least one hinge 6 in the form of a living hinge film strip. In the area of the film strip there is provided an adjustment 8, which is designed in such manner that the half dish 5 carries a groove 9, whereas half-dish 4 has a strip 10. According to FIG. 4, when holding device 1 is in closed position, the strip 10 of half-dish 4 enters into the groove 9 of half-dish 5, so that the two half-dishes 4 and 5 are connected with each other in a functionally secure and precisely adjusted and aligned relationship.

The attachment zone 2, in the embodiment according to FIGS. 1 to 4 is designed as a cylindrical casing 11 which is equipped with a transverse slot 14. The casing 11 is connected as a single integral piece with half-dish 4. Half-dish 5 exhibits a click-stop or snap-type device 7 which has, for example, two resilient and conically tapering strips 12, 13. These two strips 12, 13 are attached to a main body 27 that is equipped with resilient click-stop snap element 28. The width of click-stop element 28, as well as main body 27 and strips 12, 13, is adjusted to the width of slot 14 of casing 11.

If holding device 1 according to the invention is transferred from the open position shown in FIG. 2 to the closed position shown in FIG. 4, resilient click-stop snap element 28, main body 27 and the two resilient strips 12 and 13 position themselves in the interior of casing 11 and effect a functionally secure locking. The click-stop snap device, in addition, is likewise part of the attachment portion 2. As seen in FIG. 4, the two resilient strips 12 and 13 protrude in their anterior area beyond casing 11. Thus, when the holding device 1 is in its closed position, it can be positioned via attachment portion 2 in an aperture in a support and the two strips 12 and 13 engage and grab behind the opposite side of the support.

Between the click-stop device 7 and the attachment zone 2, each half-dish 4, 5 includes an elastic lip 20, 21, respectively, that is designed with a rectangular shape in the embodiment according to FIGS. 1 to 4. In closed position of FIG. 4, the resilient lips 20 and 21 come into contact with the other side of the support which is not shown, so that the entire holding device 1 is attached, via attachment portion 2, functionally secure in the support aperture. On the one side, the resilient strips 12 and 13 grab behind support aperture; on the other side, the resilient strips 20 and 21 contact the support and bias the strips 12 and 13 into engagement with the back side of the support.

In order to also affix tube-shaped bodies of lesser diameter between the two half-dishes 4 and 5 of holding device 1, one half-dish can, for example, be equipped with a resilient finger 26. In the subject embodiment, finger 26 is positioned, for example, unilaterally in attachment portion 2 of half-dish 4. Moreover, the length of the resilient fingers 26 can be less than the inner diameter of half-dish 4. In order to secure appropriate tubes of lesser diameter in functionally secure manner between the closed half-dishes 4 and 5, the resilient finger, in addition, may be equipped on at least one side with one or more bulges or ribs 30, which contact the respective tubes and thus improve the holding effect exerted by holding device 1.

According to the invention, there also exists the possibility that a resilient finger 26 can be placed in half-dish 5 (as shown in phantom in the drawing). Two such fingers may also face each other. Additionally, it is possible that the resilient fingers 26 can be arranged in a half-dish 4, 5, respectively, or can be arranged in both half-dishes at an angle to each other. In such arrangement, several resilient fingers may extend for example, in a ray-shaped manner.

FIGS. 5a through 5c and 6a through 6i represent different design possibilities for individual components of holding device 1. According to FIGS. 5a and 5b, there exists the possibility that, for example, half-dish 4 can have at its exterior circumference an insertion cone 22 or an insertion casing 23. Thereby an adjacent half-dish, for example, or another element, can position itself via insertion cone 22 into the insertion casing 23 of half-dish 4, so that in modular fashion, next to each other, several dish-shaped or differently shaped elements can be connected with the holding device according to the invention.

The resilient lip 20, 21', respectively, between the attachment zone 2 and the click-stop device 7, respectively, can be designed, according to FIGS. 5c and 6d, respectively, as a semi-circle, so that in closed position of the holding device according to the invention, the two parts of the elastic lip 20', 21', respectively, complement each other and form a circular, closed exterior circumference. Instead of circular shape in closed position, there may also be provided, for example, an oval shape of the elastic lips 20', 21', respectively.

The half dishes 4 and 5 need not be rigidly designed. According to FIG. 6a, there exits the possibility that the respective half-dish can have, for example, a corrugated shape. According to FIG. 6b, the respective half-dish can be equipped with an additional film hinge joint 26. According to FIG. 6c, the respective half-dish may be equipped with longitudinally extending strips or ribs 25 at the outer circumference, so that there as well, an elastic form design is achieved.

Alternative designs of the attachment portion 2, and the click-stop device 7, respectively, are illustrated in FIGS. 5d and 6c through 6i, respectively. According to FIG. 5d and 6i, two half-elements 15 and 15' by being locked together with each other in closed position can form attachment portion 2, in the shape of a so-called "pine-tree" bolt. According to FIGS. 5e and 5f, an attachment casing can consist of two components 17 and 17', which are equipped on the inside with corresponding profilations 16 and 16' that form an attachment portion 2 that can engage on a profiled stud.

According to FIG. 6e, the resilient strips 12 and 13, illustrated in FIGS. 2 and 4, may respectively be equipped with stepped or notched contact edges 18 in their free end zone so that the resilient strips position and engage themselves in improved fashion to be functionally more securely behind a support aperture. In order to include as well different thicknesses of supports, there exits, moreover, according to FIGS. 6g and 6h, the possibility that the respective resilient strips can be separated by a slot 19 and can exhibit different length sections on each side of the slot.

Figure 7A:
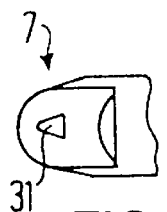
Figure 7B:
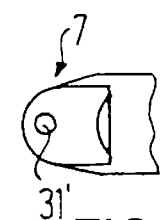

According to FIG. 7, the click-stop device 7 and the attachment portion 2, may respectively be equipped with at least one projection 31 or a corresponding borehole 32. In such arrangement, according to FIG. 7a, the projection 31 may have a triangular shape or, according to FIG. 7b, it may be designed as a knob-like projection 31'. The projection 31, 31', respectively, can position itself in the assembled form in a correspondingly designed groove 32 of casing 11 of the attachment portion 2. Thus, projection 31, 31' snaps into borehole 32, whereby, in simple fashion, a centering of the unit is assured.

Figure 7C:
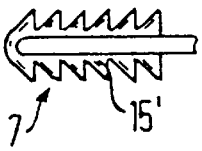
Figure 7D:
Figure 7E:
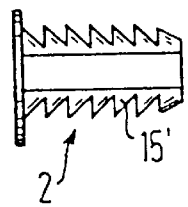

According to FIGS. 7c and 7e, respectively, the click-stop device 7 and the attachment portion 2 may be designed as part of the so-called "pine-tree" bolt 15, 15', respectively. In such arrangement, the part 15', which constitutes the click-stop device 7, is designed in such manner that it can position itself in the assembled state in the pine-tree bolt part 15' of attachment portion 2.

Figure 8A:
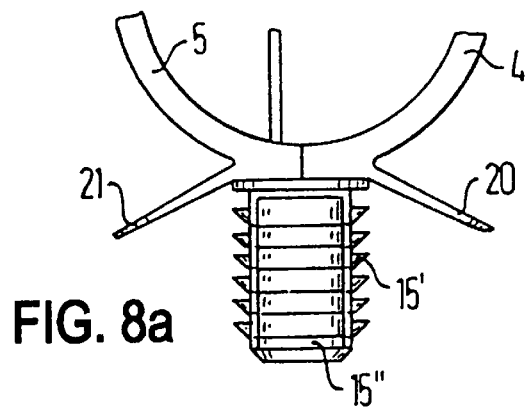
FIGS. 8a and 8b show a design variation of the embodiment according to FIGS. 7c and 7e in side and end view, respectively.
Figure 8B:
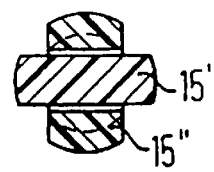

FIG. 8 illustrates how the part of the pine-tree bolt 15' positions itself in the correspondingly designed counter part 15" of the pine-tree bolt. FIG. 8 indicates the section through both parts. As can be seen, this results in an assembled unit comprised of components 15' and 15", which constitutes an approximately cylindrical pine-tree bolt.

According to FIG. 9, there exists the possibility to attach the resilient finger 26' on both ends at the interior circumference of half dishes 4, 5, so that improved holding effect is attained. In such an arrangement, resilient finger 26' may have a lesser width than the half-dish. It may further more be made of softer and/or more resilient plastic than the plastic of the half-dishes 4, 5, and extruded onto the same via the known two-component extrusion process.

The resilient fingers 26' may be unilaterally equipped with at least one bulge or rib 30, in order to provide secure positioning for the elements which are held in the half-dishes.

According to FIG. 10, there exists, relative to the design of the lip, the possibility to design the same as a circumferential sealing lip 20', and to extrude it merely onto one of the two half dishes 4, 5. Because of the single-piece construction, there results improvement in the sealing effect.

In all preceding designs, the holding device 1 is designed as a single piece, in other words, the two half-dishes 4 and 5, including the film strip 6 form a unitary, single-piece unit.

With respect to the designs according to FIGS. 11 to 13, there exists the possibility that the two half-dishes can include a specialty designed hinge-joint 6', whereby the two cooperating areas of the hinge-joint of the two half dishes 4 and 5 are connected with each other in articulated fashion by means of a pin 33.

According to FIGS. 11a and 11b, the respective hinge element 6' of the two half dishes 4 and 5 has a slot 34, 34', respectively, in its lower zone. Thus, the respective hinge element 6' does not encompass pin 33 over its entire exterior circumference.

It is apparent from FIG. 11b, that between the two zones of hinge elements 6' there is a gap 35, so that, overall, satisfactory easy action of the hinge-element 6' is assured.

According to FIGS. 12a and 12b, the respective hinge element 6' of main dish 4, 5 forms a closed unit, so that the respective pin 33 positioned in the hinge zones is surrounded on one side at its exterior circumference by the corresponding parts of hinge element 6'. Once again, a gap 35 is provided to ensure easy action of hinge element 6'.

FIG. 13 represents another alternative design possibility for the hinge element 6'. In this arrangement, the half dish 4 exhibits two outer hinge-element zones 6'. Between these is positioned in the gap 35 a hinge element zone 6' assigned to half-dish 5. The three zones of hinge element 6' of the two half dishes 4 and 5 are, in turn, traversed by a pin 33.

Figure 14:
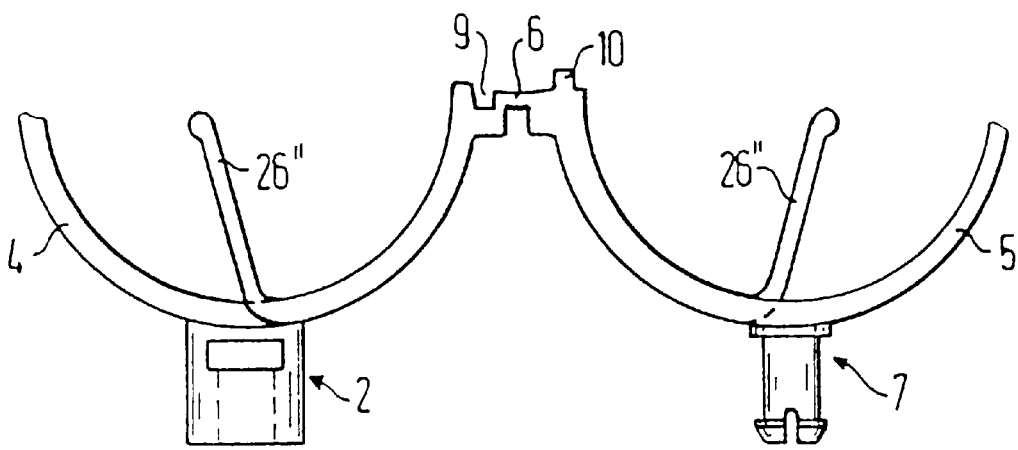
FIG. 14 shows a side elevational view of a further possible form of the invention.
Figure 15:
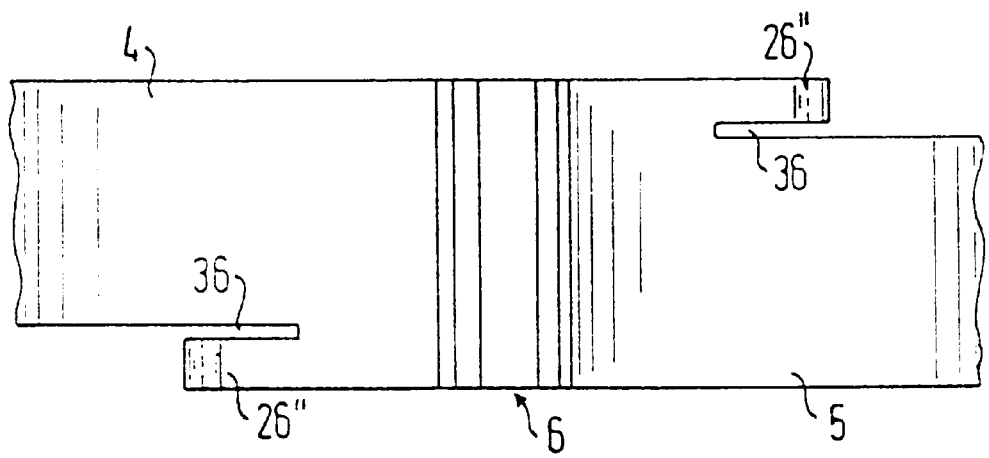
FIG. 15 is a partial top plan view of the FIG. 14 embodiment.

The pin 33 can be designed, for example, as a metal pin. Alternatively, there also exists the possibility that the pin 33, as well as the two half dishes 4 and 5, can be made of plastic. Thus, during the manufacture of the holding device 1, according to the invention, the plastic pin 33 is extruded and the two half dishes can be connected in one working step via the hinge element 6'. Whereas in the preceding forms of the invention the resilient finger 26, according to FIG. 1, is arranged in the middle zone of the respective half-dish 4 or 5, there exits, according to FIGS. 14 and 15, also the possibility that resilient finger 26" can be positioned in the area of the side wall of the two half dishes 4, 5, respectively. These resilient fingers 26" can be separated by means of a slot 36 from the respective half-dish 4 or 5. According to FIGS. 14 and 15, there then exist in the area of half-dish 4 or 5, two obliquely upwardly protruding resilient fingers 26". These fingers are positioned so that in the mounted state, they do not obstruct each other on the one side, and, on the other side, provide excellent seating for the tube elements being secured.

Figure 16A:
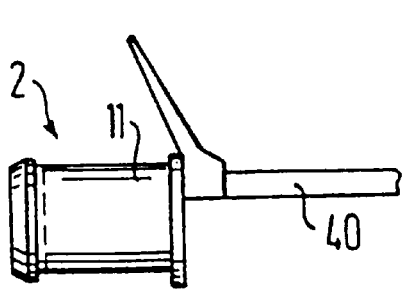
FIGS. 16a and 16b show two further forms of the invention.
Figure 16B:
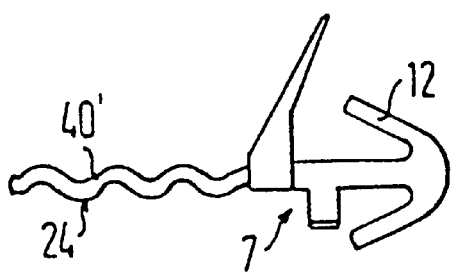

According to FIG. 16, there may be extruded by means of the two-component extrusion process onto the attachment portion 2 (for instance having casing 11 and strip 12 which together forms the click-stop device 7) at least one band 40 made of softer and more resilient material than to the material of the attachment portion 2. The band 40 forms the two half dishes 4, 5, and according to FIG. 16, it can be looped around the object which is to be held. There also exists the possibility, according to FIG. 16b, that the band 40' can be formed analogous to FIG. 6a to have a profile-shape, for instance in wave form 24', so that improved elasticity is attained. In total, there results a particularly simply constructed, beneficial design of the holding device.

Overall, there exists a wide variation in the range of the individual elements, whereby in each case the holding device 1 forms in mounted state two half dishes 4 and 5, which may be connected with each other by at least one film band 6, or hinge element 6' and which exhibit in the attachment portion 2 a click-stop device 7, which simultaneously is part of the attachment zone 2.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. In a holding device made of plastic for holding and fastening of at least one tube-shaped body to a support and including an attachment portion connectable to the support by insertion into a support opening and a holding portion for enveloping the tube-shaped body, with the holding portion comprising two dish-shaped elements which each terminate in first and second ends, the improvement wherein the attachment portion is comprised of two separate components, the first ends of the dish-shaped elements being connected by a hinge means and the second ends each separately connected to a separate component of the attachment portion, the separate components of the attachment portion being selectively connectable by a catch means formed in the components of the attachment portion that connects the two dish-shaped elements in relationship to envelope the tube-shaped body and subsequent to connection allows the attachment portion to be inserted into the support opening, one of the separate components of the attachment portion includes a slot that receives the other of the separate components of the attachment portion when the catch means is in the connected condition.

2. A holding device according to claim 1 wherein the two half-dishes (4, 5) and the hinge means are formed in one piece.

3. A holding device according to claim 2 wherein the hinge means comprises a film band (6).

4. A holding device according to claim 1 wherein the two dish-shaped elements (4, 5) include an alignment means (8) for producing alignment of the two dish-shaped elements (4, 5) when the catch means (7) is in the connected condition.

5. A holding device according to claim 4 wherein the alignment means (8) comprises a groove (9) in one dish-shaped element (5) and a strip in the other dish-shaped element (4) for insertion in the groove (9).

6. A holding device according to claim 1 wherein the hinge means includes a pin (33).

7. A holding device according to claim 6 wherein the pin (33) is a plastic pin and is extruded together with the hinge means (6').

8. A holding device according to claim 1 wherein the catch means (7) is part of the attachment portion (2).

9. A holding device according to claim 8 wherein the attachment portion (2) comprises a slotted casing (11) in the interior area of which the catch means (7) is received.

10. A holding device according to claim 9 wherein the attaching portion includes two oppositely facing resilient and conically tapering strips (12, 13) which protrude at least partially beyond the exterior circumference of the slotted casing (11) when the second ends of the dish-shaped elements are in connected relationship.

11. A holding device according to claim 10 wherein the resilient strips (12, 13) are provided with free ends that include notched end edges (18).

12. A holding device according to claim 10 wherein the resilient strips (12, 13) are separated by at least one slot (19) and wherein the portions of the strips on each side of the slot are of a different length.

13. A holding device according to claim 9 wherein the slotted casing (11) and the catch means (7) are equipped with interacting alignment means including a groove (32) and a projection (31, 31').

14. A holding device according to claim 8 wherein the attachment portion (2) and the catch means (7) are respectively designed as interlockable parts (15, 15') of a pine-tree type bolt.

15. A holding device according to claim 8 wherein the attachment portion (2) and the catch means (7) are interlockable parts forming an attachment casing equipped with internal profiling.

16. A holding device according to claim 1 wherein between the respective dish-shaped elements (4, 5) and the attachment portion (2) there is arranged a resilient lip (20, 21; 20', 21').

17. A holding device according to claim 16 wherein the resilient lip (20, 21) has a rectangular outer configuration.

18. A holding device according to claim 16 wherein the resilient lip (20, 21') has a curved outer circumference.

19. A holding device according to claim 16 wherein the resilient lip (20') extends circumferentially fully about a dish-shaped element.

20. A holding device according to claim 1 wherein at least one dish-shaped element (4, 5) is provided with means for connecting it to an adjacent holding device.

21. A holding device according to claim 1 wherein the half-dishes (4, 5) have at least an additional film hinge (26).

22. A holding device according to claim 1 wherein the dish-shaped elements (4, 5) are formed from an elastic material.

23. A holding device according to claim 1 wherein at least one dish-shaped element (4) carries a resilient finger (26).

24. A holding device according to claim 23 wherein the resilient finger (26) is positioned on one side of the holding portion.

25. A holding device according to claim 23 wherein the dish-shaped elements (4, 5) have several resilient fingers (26).

26. A holding device according to claim 23 wherein a resilient finger (26') is attached to each of the dish-shaped elements (4, 5).

27. A holding device according to claim 26 wherein the resilient fingers are made of a softer material than the respective dish-shaped element (4, 5) and wherein both materials are bonded to each other by means of the two-component extrusion process.

28. A holding device according to claim 23 wherein the resilient finger (26) has a lesser width than the half-dish (4).

29. A holding device according to claim 23 wherein the resilient finger (26) has at least one rib on a side thereof.

30. A holding device according to claim 23 wherein the length of the resilient finger (26) is less than the inner diameter of the at least one dish-shaped element (4).

* * * * *